United States Patent

Emig

Patent Number: 5,794,517
Date of Patent: Aug. 18, 1998

[54] PISTON ASSEMBLY

[75] Inventor: Juergen Emig, Grasellenbach, Germany

[73] Assignee: Firma Carl Freudenberg, Weinheim, Germany

[21] Appl. No.: 631,294

[22] Filed: Apr. 9, 1996

[30] Foreign Application Priority Data

Apr. 11, 1995 [DE] Germany ............... 195 13 727.2

[51] Int. Cl.[6] ............................................. F16J 9/00
[52] U.S. Cl. ................... 92/244; 92/245; 92/181 P; 92/249; 29/888.047; 29/888.049
[58] Field of Search ................. 92/192, 240, 250, 92/249, 254, 242, 243; 277/170, 171, 172; 29/888.04, 888.047, 888.049; 188/322.18

[56] References Cited

U.S. PATENT DOCUMENTS

| | | | |
|---|---|---|---|
| 1,802,281 | 4/1931 | Shimer | 92/243 |
| 3,212,411 | 10/1965 | Storms. | |
| 4,484,512 | 11/1984 | Dechavanne | 92/243 |
| 5,345,860 | 9/1994 | Bowell | 92/192 |
| 5,435,233 | 7/1995 | Bowell | 92/192 |
| 5,520,092 | 5/1996 | Iida et al. | 92/249 X |

FOREIGN PATENT DOCUMENTS

| | | | |
|---|---|---|---|
| 489469 | 7/1938 | United Kingdom | 92/192 |
| 887936 | 1/1958 | United Kingdom | 92/243 |

*Primary Examiner*—Hoag Nguyen
*Attorney, Agent, or Firm*—Kenyon & Kenyon

[57] ABSTRACT

A piston assembly that is movable back and forth parallel to its axis in a cylindrical housing, comprising a piston-like support part made of a hard material and a guide ring made of a polymer. The guide ring surrounds the support part along a portion of the axial length of the piston. The support part and the guide ring are joined to each other via frictional and/or form locking provided by mating between grooves on the support part and a corresponding number of radial projections on the guide ring. A set of axially spaced apart sealing lips, integrally molded with the guide ring, extends axially beyond the grooves to provide a seal with respect to the cylinder wall.

14 Claims, 1 Drawing Sheet

PISTON ASSEMBLY

BACKGROUND OF THE INVENTION

The invention relates generally to a piston assembly that is capable of undergoing axially reciprocal motion within a cylindrical housing, and more particularly to a piston assembly having a support part (i.e., a piston) made of a hard material and a guide ring made of a polymer material surrounding the support part along a portion of the support part, the support part and the guide ring being joined to each other with frictional and/or form locking.

This general type of piston assembly is described in U.S. Pat. No. 3,212,411 (the contents of which are incorporated herein by reference for background purposes). The piston disclosed therein is used within a shock absorber, and employs a guide ring (which functions as a sealing member) that preferably is made of PTFE (polytetrafluoroethylene). The piston is provided with essentially V-shaped grooves near its end face, which can be forced into engagement with the inner circumferential surface of the guide ring.

There remains a need to further develop a piston assembly of this general type in which the support part and the guide ring are joined to one another in a simple and durable manner. It is also desirable that during assembly of the support part with the guide ring, sealing lips be formed in the axial direction on both sides of the piston. The utility of such sealing lips is that they could be forced into contact with the surface the inner wall of the cylinder, thereby producing a seal.

SUMMARY OF THE INVENTION

The present invention meets this need by providing a support part (i.e., a piston) having at least one groove running along its periphery that is radially open in the direction of a guide ring, which in turn engages the groove via at least one projection. The guide ring is produced during assembly, and protrudes radially in the direction of the support part. The axially displaced sides of the guide ring form integrally molded sealing lips (which too, are produced during manufacture) that axially extend beyond the contact surface of the support part. One advantage of this design is that the manufacture of the piston can be accomplished in a simple and economical manner. Moreover, the support part and the guide ring are joined to one another in an exceptionally durable fashion.

In assembly, the blank of the guide ring is axially slipped over the exterior of the support part, positioned in place, and then radially compressed. The radial compression of the guide ring causes the material to flow into the grooves of the support part, forming radial projections on the guide ring that mate and lock with the grooves. Concomitantly, some of the material flows axially under compression, thereby forming axially displaced sealing lips along both ends of the guide ring. The sealing lips thus formed extend beyond the contact surface of the support part with the cylinder in the axial direction. This method obviates the need to separately form correspondingly shaped mating surfaces for both the support part and guide ring, which can be a costly process. During the pressing of the guide ring in the radial direction, the material simply flows into the grooves of the support part until they are completely filled in, and spreads out in the axial direction. In this manner the axially protruding sealing lips are economically formed.

The support part can be provided with two or more axially spaced apart grooves that engage a corresponding number of projections of the guide ring in the final assembled state. Such an arrangement provides for an even more secure positive-locking, claw-like connection between the support part and guide ring.

The grooves on the support part may be provided by a series of steps of integrally molded, radial projections on the exterior of the support part. These steps have an aggregate axial length that is no greater than the axial length, during manufacture, of the guide ring, and are smaller than the final maximum combined axial length of the support part and sealing lips. The radial projections are sized so that the guide ring can be reliably secured to the support part, and so have an extent that corresponds to the radial depth of the grooves on the support part. The radial projection permits the entire guide ring, including the two sealing lips, to be smaller in the axial direction than the piston. This reduction in the axial length required of the guide ring reduces the amount of material required, thereby lowering the costs of producing the piston assembly. This structural form also reduces the friction between the cylinder wall and the piston.

The outer diameter of the support part need not be precisely uniform along its entire axial length, which means that both the material used in manufacturing and the weight of the finished piston can be reduced. Due to its comparatively small mass, the inertia of the piston is markedly reduced in the event of changes in its acceleration, which in turn reduces mechanical stress on the parts and prolongs service life.

At the start of the manufacturing process, the guide ring has a greater radial thickness, a larger outside diameter and a smaller axial length than in the final assembled state. The installation of the guide ring on the support part is carried out by a non-cutting shaping of the guide ring, which consists of polymer material. Consequently, no waste material (which would then have to be recycled) is formed during the process.

The exterior of the guide ring can be provided with a friction-reducing surface coating. The guide ring itself is preferably made of PTFE, in which case the level of friction between the housing and the guide ring is already reduced to a minimum, so that the guide ring is subject to almost no wear and tear and therefore exhibits uniformly good working properties during the entire service life. Through an initial period in which a minimal level of certain wear and tear occurs, the PTFE guide ring glazes the inner wall of the cylinder housing, thereby rendering it largely friction-free.)

The support part can be used as a dividing piston in a shock absorber, and can have at least one throttle opening which extends parallel to the axis to connect spaces axially adjacent to either side of the dividing piston in a manner allowing fluid communication. If the piston is used in a shock absorber, its simple construction, the cost-effective manner in which it can be produced and its low weight are all of particular advantage.

BRIEF DESCRIPTION OF THE DRAWINGS

For a more complete understanding of this invention, reference should now be made to the embodiment illustrated in greater detail in the accompanying drawings and described below. In the drawings.

DETAILED DESCRIPTION

Figure 1:
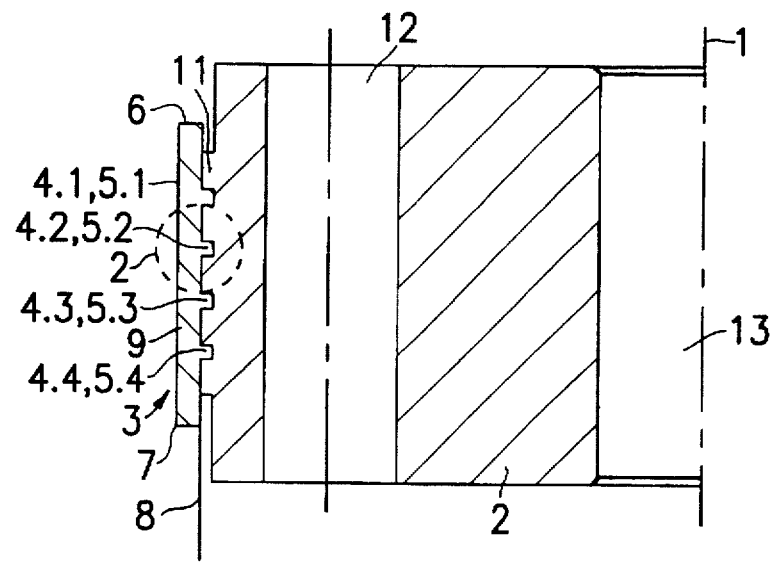
FIG. 1 is a half-sectional view of a piston constructed according to the principles of the invention.
Figure 2:
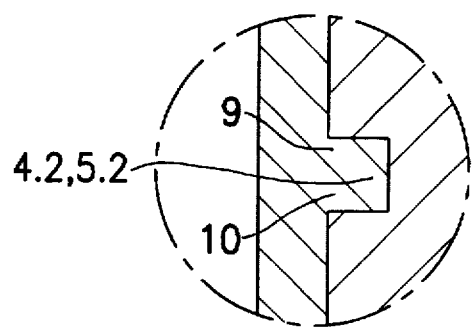
FIG. 2 is a magnified view of region X of FIG. 1.

The drawings illustrate an embodiment of a piston assembly constructed according to the principles of the invention, here shown for use in a shock absorber. The piston assembly consists of a metallic support part 2 (i.e., a piston) that is rotationally symmetrical about axis 1 and which is surrounded by a guide ring 3 made of PTFE. The support part 2 has a centrally located, axially extending bore 13 for securing the part to a piston rod (not shown here). An axially extending throttle opening 12, parallel to and offset from bore 13, traverses the support part 2.

The outer peripheral side the support part 2 is provided with a stepped set of integrally molded radial projections 11. In the embodiment shown, the axial spacing is exactly matched by the expansion of the material of the guide ring 3 that occurs during manufacture.

In the embodiment shown, four adjacent, axially spaced grooves 4.1, 4.2, 4.3, and 4.4 are provided, each having a radial depth that corresponds to the radial height of the radial projection 11.

To manufacture the piston assembly, the blank of the guide ring 3 is slipped over the outer periphery of part 2 in a first process step. The blank of the guide ring 3 and the outside diameter of the radial projection 11 are sized so that they contact each other essentially without play, which simplifies the positioning of the two parts relative to one other. The guide ring 3 is then pressed uniformly in the radial direction along its entire circumference. The material of the guide ring 3 begins to flow under this pressure, and the grooves 4.1, 4.2, 4.3, and 4.4 of the support part 2 are completely filled in by material of the guide ring 3.

A concomitant effect of this radial pressing is that portions of the material flow in the axial direction along the radial projection 11 to form the sealing lips 6 and 7, which concentrically surround the axis 1. By appropriate selection of level of the radial pressure on the guide ring 3, the material used and the dimensions of the grooves, the sealing lips 6 and 7 are in their final and desired form just as the grooves 4.1–4.4 are completely filled in by the projections 5.1–5.4.

What is claimed is:

1. A piston assembly that is capable of axially reciprocal movement within a cylindrical housing, comprising:

a piston having an axial length, said piston being made of a hard material and having a periphery on which is at least one groove that is radially open to the exterior of the piston; and a guide ring made of a polymer material that surrounds the piston along at least a portion of the axial length of the piston, said guide ring having at least one radially inwardly directed projection that mates with the groove on the piston so as to form-lock therewith, the guide ring further having a set of axially spaced apart integrally molded sealing lips that extend in the axial direction beyond the groove of the piston, and wherein the guide ring has a greater radial thickness, a larger outside diameter and a smaller axial length prior to manufacture than in its final assembled state.

2. A piston assembly as set forth in claim 1, wherein the piston has at least two axially spaced apart circumferential grooves, and the guide ring has a corresponding number of radially inwardly directed projections that mate with the grooves on the piston.

3. A piston assembly as set forth in claim 1, wherein the exterior of the piston has a series of integrally molded radial projections having an aggregate axial length that is less than the axial length of the piston and also less than the combined axial length of the guide ring and sealing lips.

4. A piston assembly as set forth in claim 3, wherein the radial extent of the projections defines the radial depth of the grooves on the piston.

5. A piston assembly as set forth in claim 1, wherein the guide ring has a friction-free coating on its exterior.

6. A piston assembly as set forth in claim 2, wherein the guide ring has a friction-free coating on its exterior.

7. A piston assembly as set forth in claim 3, wherein the guide ring has a friction-free coating on its exterior.

8. A piston assembly as set forth in claim 1, wherein the guide ring comprises polytetrafluoroethylene.

9. A piston assembly as set forth in claim 5, wherein the guide ring comprises polytetrafluoroethylene.

10. A piston assembly as set forth in claim 1, wherein the piston has at least one axially extending bore for use as a throttle opening to fluidically connect axially displaced regions on either side of the piston.

11. A piston assembly as set forth in claim 3, wherein the piston has at least one axially extending bore for use as a throttle opening to fluidically connect axially displaced regions on either side of the piston.

12. A method for manufacturing a piston assembly, comprising the steps of:

sliding a guide ring blank over the exterior of a piston having grooves;

positioning the guide ring blank in place;

radially compressing the guide ring blank so that material flows radially from the guide ring blank into the grooves of the piston and axially beyond the grooves so as to form sealing lips.

13. A method as set forth in claim 12, wherein the guide ring blank is made of polytetrafluoroethylene.

14. A method as set forth in claim 13, further comprising the step of coating the inner wall of a cylinder with the material of the guide ring so as to reduce friction therebetween.

* * * * *